United States Patent [19]
Wilson et al.

[11] Patent Number: 4,579,252
[45] Date of Patent: Apr. 1, 1986

[54] LOSS-IN-WEIGHT GRAVIMETRIC FEEDER

[75] Inventors: David H. Wilson; Kenneth W. Bullivant, both of Scottsdale, Ariz.

[73] Assignee: K-Tron International, Inc., Scottsdale, Ariz.

[21] Appl. No.: 491,708

[22] Filed: May 5, 1983

[51] Int. Cl.⁴ .............................................. G01G 11/08
[52] U.S. Cl. ...................................... 222/55; 222/56; 222/77; 177/90; 177/114
[58] Field of Search ...................... 222/77, 55, 56, 57, 222/58, 63; 198/504, 505; 177/114, 70, 90

[56] References Cited

U.S. PATENT DOCUMENTS

| | | | |
|---|---|---|---|
| 600,031 | 3/1898 | Richards | 222/77 |
| 1,354,747 | 10/1920 | Hiller . | |
| 2,652,984 | 5/1949 | Dodds | 241/135 |
| 3,081,588 | 3/1963 | Klapes et al. | 53/78 |
| 3,303,966 | 2/1967 | Buschbom | 222/1 |
| 3,497,109 | 2/1970 | Leach | 222/144.5 |
| 3,690,392 | 9/1972 | Smith | 177/59 |
| 3,734,215 | 5/1973 | Smith | 177/59 |
| 3,762,451 | 10/1973 | Anderson | 141/186 |
| 4,039,062 | 8/1977 | Carre et al. | 222/485 |
| 4,054,784 | 10/1977 | Ricciardi et al. | 222/55 |
| 4,266,691 | 5/1981 | Wolwowicz | 222/77 |

FOREIGN PATENT DOCUMENTS 274563  1/1966  Australia .............................. 222/55

OTHER PUBLICATIONS

Masatsugu Nomura and Masayuki Yasuguchi, "Flow Rate Control of Particulate Material and Control Process", *Partical and Industry,* Mar. 1983, pp. 57–61.

Primary Examiner—Charles A. Marmor
Attorney, Agent, or Firm—Parkhurst & Oliff

[57] ABSTRACT

A loss-in-weight gravimetric feeding system is disclosed which includes a prefeeder for receiving and discharging material and at least first and second feeders for receiving material from the prefeeder and discharging the received material to a common collector. The system includes a device for alternately diverting material discharged from the prefeeder to the first and second feeders, circuits for generating a first and second weight signal representative of the weight of material in the first and second feeders respectively, and structure for generating a reference signal representative of a desired mass flow rate of material from a feeder. The system further includes a circuit for alternately comparing the reference signal to the first and second weight signals in synchronism with the diverting device for controlling each of the feeders based on the comparison between the reference signal and the weight signal associated with the feeder.

24 Claims, 6 Drawing Figures

LOSS-IN-WEIGHT GRAVIMETRIC FEEDER

BACKGROUND OF THE INVENTION

Loss-in-weight feeders are in widespread use in the material handling industry and are used to deliver particulate and other materials at precise feed rates. Typically, a loss-in-weight feeder measures the decreases in weight of material contained in the feeder over a period of time. The weight loss by the feeder in that period of time is exactly equal to the weight of material delivered to the next step in the material handling process. This mode of operation, because it measures change in weight per unit time, is referred to as "gravimetric" operation.

An advantage of loss-in-weight feeders is that there is no possibility of feed rate errors due to storage or material accumulation in the material handling system. Thus, for example, if it is determined that the weight of a loss-in-weight feeder has descreased 30 pounds in one hour, then it can be said with certainty that those 30 pounds have been delivered to the next step in the process and are not "lost" due to storage or spillage somewhere in the system upstream of the feeder.

A disadvantage of present loss-in-weight feeding systems is that, in measuring weight loss from a feeder, accurate weight measurements cannot be made when material is being added to the feeder during refill. While the feeder is being refilled, loss-in-weight measurements are impossible because material is being added to the feeder at an uncontrolled rate. In addition, the weighing device, usually a scale, is subjected to impact forces generated by the added material, entrapped air, and other factors which result in weight readings that vary widely and are inaccurate. During refill, therefore, it is customary to operate loss-in-weight feeders in a volumetric mode (which delivers a given volume of material per unit time) rather than in a gravimetric mode which would produce inaccurate feed control. Because refill may constitute a substantial portion of the feeder operating cycle, the overall accuracy of the system may be significantly reduced.

The necessity for switching to a volumetric mode of operation during refill has additional disadvantages as well. In order to achieve high feed rates, refill time must be minimized. This requires expensive, high-quality, critically-damped scales to make certain that perturbations introduced during refill have been damped out when the system re-enters the gravimetric mode. If the chosen scale is under-damped or over-damped, large hoppers are required to ensure that the system will operate in gravimetric control for a long enough time to provide stable weight data. However, the use of large hoppers to accomodate high feed rates can also result in poor accuracy because larger hoppers are more easily affected by outside forces than small hoppers. In order to minimize inaccuracy, therefore, feed rates must generally be kept low.

Accordingly, the present invention has been developed to substantially reduce the foregoing problems and to produce an improved loss-in-weight feeding system which allows gravimetric operation for 100 percent of the operating time.

SUMMARY OF THE INVENTION

In accordance with the present invention, the loss-in-weight gravimetric feeding system includes a prefeeder for receiving and discharging material and at least first and second feeders for receiving material from the prefeeder and discharging the received material to a common collector. The invention includes means for alternately diverting material discharged from the prefeeder to the first and second feeders, means for generating a first and second weight signal representative of the weight of material in the first and second feeders respectively, and means for generating a reference signal representative of a desired mass flow rate of material from a feeder. The invention further includes means for alternately comparing the reference signal to the first and second weight signals in synchronism with the diverter means and means for controlling each of the feeders based on the comparison between the reference signal and the weight signal associated with the feeder.

It is therefore a feature of the invention to provide an accurate loss-in-weight feeding system.

It is another feature of the invention to provide a continuous loss-in-weight gravimetric feeding system for feeding at high feed rates.

It is still another feature of the invention to provide a continuous loss-in-weight feeding system which is compact and easily implemented.

A still further feature of the invention is to provide a continuous loss-in-weight feeding system which obviates the need for volumetric control during refill.

These and other advantages and novel features of the invention will become apparent from the following detailed description when considered in connection with the accompanying drawings wherein:

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF A PREFERRED EMBODIMENT

Figure 1:
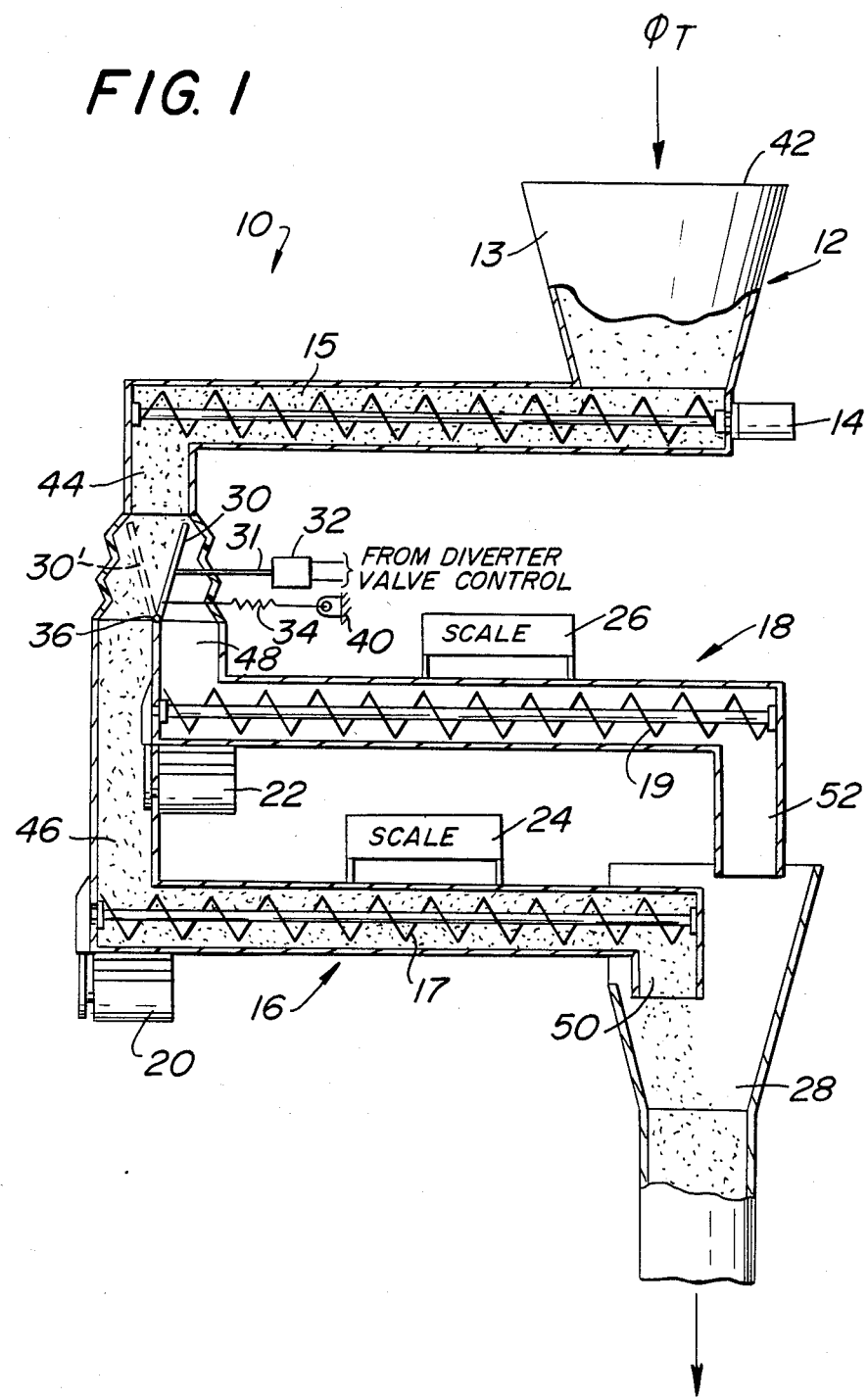
FIG. 1 shows a loss-in-weight gravimetric feed system in accordance with the present invention in diagrammatic form.

Referring now to the drawings, wherein like numerals indicate like elements, there is shown in FIG. 1 a loss-in-weight feeder 10 in accordance with the present invention.

Material to be fed by the system is put into the inlet 42 of prefeeder 12. Material inflow is indicated by $\phi_T$. Prefeeder 12 may be any conventional feeding apparatus. Prefeeder 12 has a hopper 13 provided with a feed screw, auger or other conventional material feed apparatus 15, which is controlled by feed motor 14. Located below prefeeder 12 are two feeders 16 and 18. Feeders 16 and 18 have inlets 46 and 48, respectively, and comprise material feeding apparatus such as a feed screw or other conventional feeding apparatus 17 and 19, respectively, controlled by feed motors 20 and 22, respectively. Although for convenience the term "feed screw" is used in this description, it should be understood that the invention includes the use of any suitable material feeding apparatus and is not limited to the use of a feed screw.

Feeders 16 and 18 are suspended from scales 24 and 26, respectively, which weigh the feeders 16 and 18 and the material therein. Scales 24 and 26 are conventional scales and generate electrical signals representative of the weight of feeders 16 and 18. The weight signals generated by scales 24 and 26 will be referred to herein as weight "A" and weight "B" signals, respectively. (Although the term "weight" is used throughout this description, mass rather than weight may be sensed. Accordingly, the term weight should be read as including either weight or mass, without departing from the scope of the invention.) Feeders 16 and 18 also have outlets 50 and 52, respectively, from which material being fed is discharged to a common collector 28, which may be any suitable collector.

Located immediately below the outlet 44 of prefeeder 12 is a diverter valve 30. In the embodiment illustrated, diverter valve 30 is a blade-shaped member which pivots at one end 36 between a first position (shown in solid lines) and a second position 30' (shown in broken lines). Diverter valve 30 serves to divert the flow of material from prefeeder 12 alternately to feeders 16 and 18 so that changing the position of diverter valve 30 from the first position to the second position 30' will cause feeders 16 and 18 to be filled alternately with material from prefeeder 12.

In the illustrated embodiment of the invention, diverter valve 30 is biased by spring 34 which is connected to diverter valve 30 at a point 38 somewhere above pivot 36. Spring 34 is anchored to a fixed member at 40. Spring 34 serves to urge diverter valve 30 to the first position. Diverter valve 30 is moved from the first position to the second position 30' by means of a push rod 31 which pushes diverter valve 30 against the force exerted by spring 34 to position 30'. Push rod 31 is shown in FIG. 1 as being actuated by an electric solenoid 32, but may be actuated by any suitable means, such as a hydraulic or pneumatic piston. When solenoid 32 is energized, push rod 31 pushes against diverter valve 30 and causes the valve 30 to move to position 30'. When solenoid 32 is de-energized, push rod 31 retracts, and diverter valve 30 moves from the second position 30' back to the first position under the force of spring 34.

It should be understood that the particular mechanism which causes diverter valve 30 to change position is not critical to the invention. Thus, for example, diverter valve 30 may be caused to move by use of two opposed solenoids or two opposed pistons, or any other mechanism for effecting movement of diverter valve 30, without departing from the instant invention. Likewise, it should be understood that any other type of diverter valve may be used without departing from the scope of the invention.

In operation, prefeeder 12 discharges material continuously. When diverter valve 30 is in the first position, material added to the system flows through prefeeder 12 and is diverted by diverter valve 30 into feeder 16. When diverter valve 30 is in position 30', the material discharged by prefeeder 12 is diverted to feeder 18. Diverter valve 30 is in the first position for 50 percent of the time and is in the second position 30' for 50 percent of the time, so that the material discharged by prefeeder 12 is alternately directed to feeders 16 and 18. That is, the period of time in which diverter valve 30 diverts material to feeder 16 is substantially equal to the period of time in which diverter valve 30 diverts material to feeder 18. The volumetric capacity of prefeeder 12 is preferably less than or equal to 80 percent of the volumetric capacity of feeders 16 and 18, so that there is not possibility of overfilling feeders 16 and 18 or of having material "back up" in the system.

Figure 2:
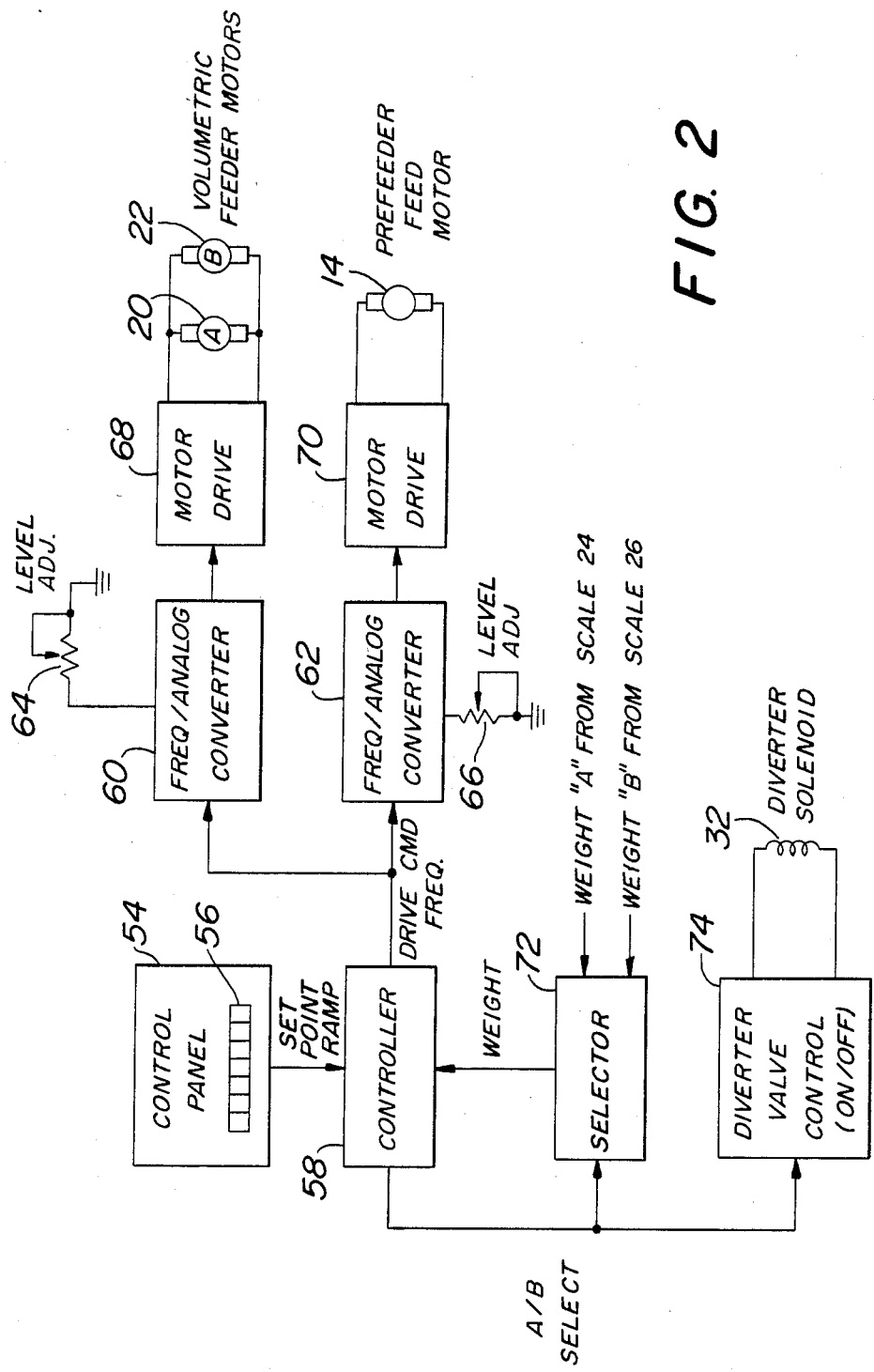
FIG. 2 is a block diagram of the control circuitry used in the system shown in FIG. 1.
Figure 3:
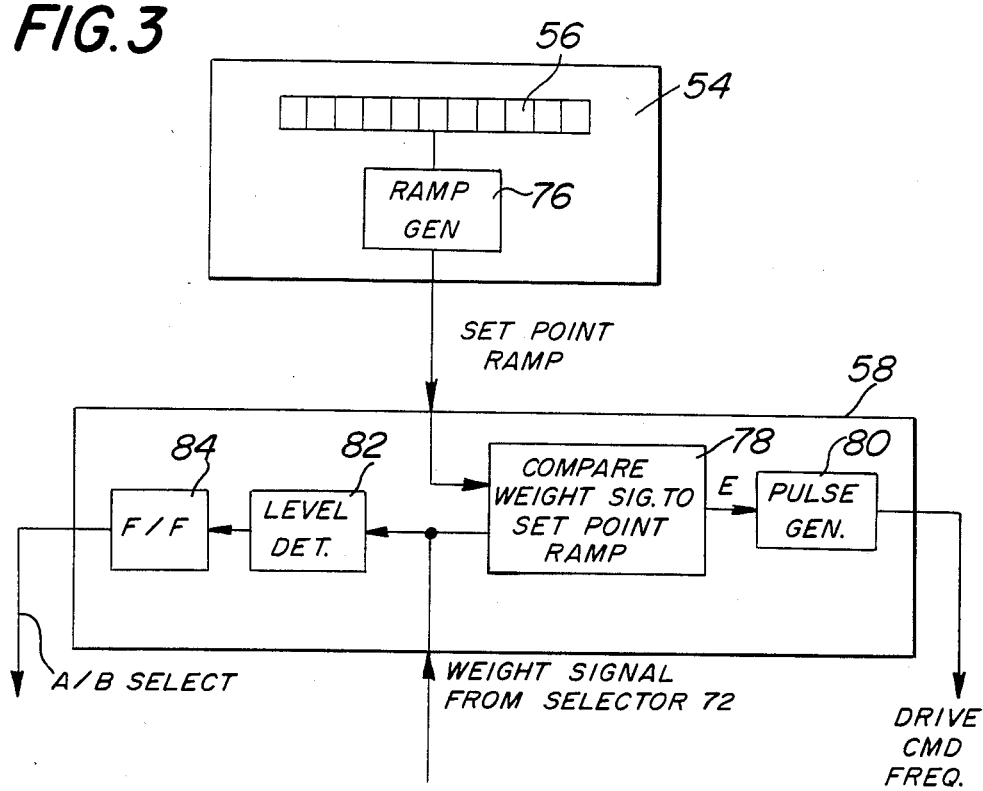
FIG. 3 is a portion of the control circuitry shown in FIG. 2, showing additional internal details of the control panel and the controller.
Figure 4:
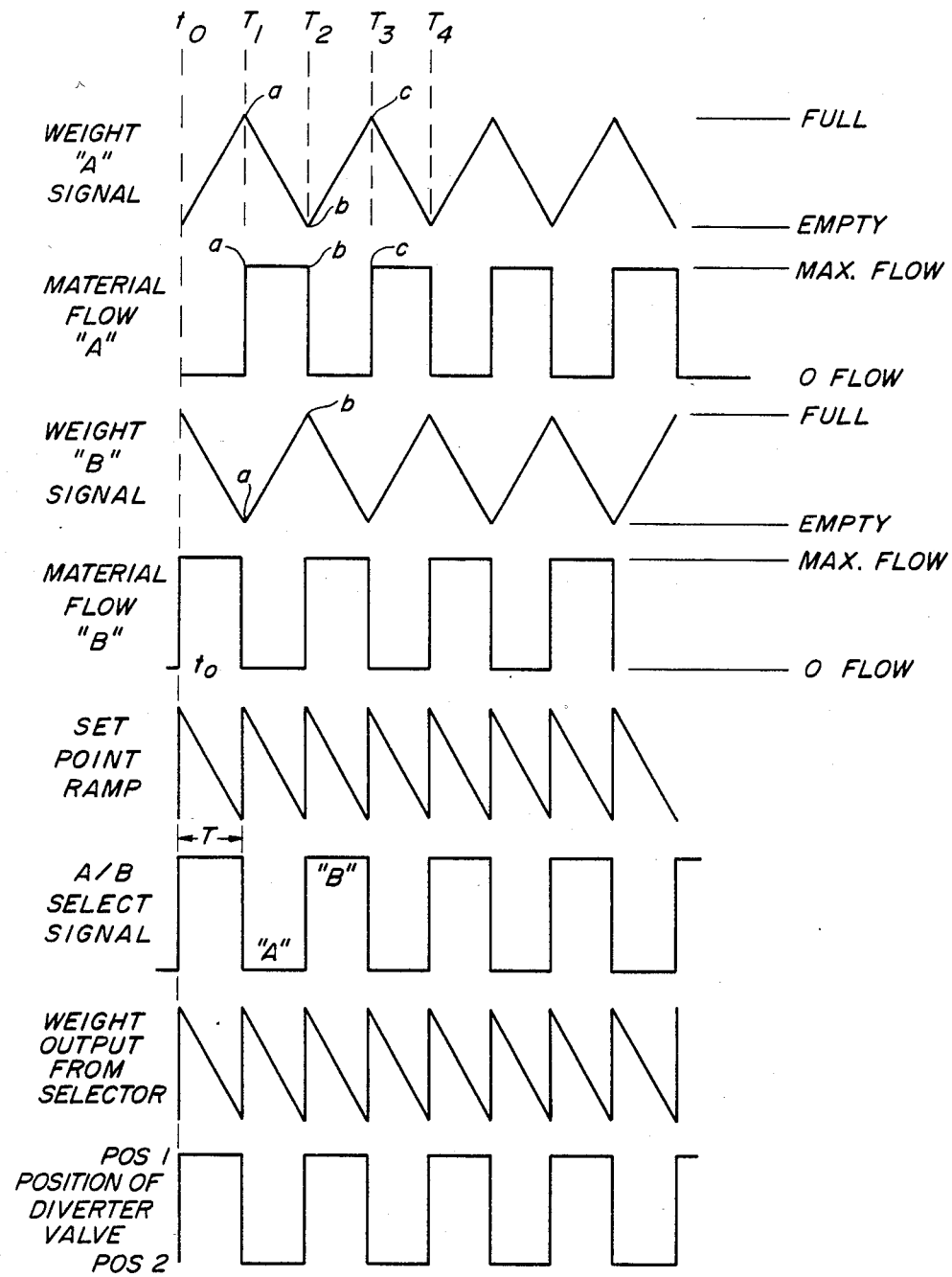
FIG. 4 is a timing diagram showing the relationship of material flow, scale weight and control signals with respect to time. The signals have been idealized for clarity.

A block diagram of the control circuitry for the invention is shown in FIG. 2. Controller 58 includes a control panel 54, which has a row of switches 56 to enable an operator to select the desired mass flow rate of the system. The output of control panel 54 is a signal which is a negative-going ramp, the slope of which is representative of the desired rate of decrease of the weight of feeders 16 or 18 during discharge, i.e., the desired mass flow rate of feeders 16 or 18. The ramp wave-form is generated by ramp generator 76, shown in FIG. 3. The manner in which the ramp wave-form may be generated will be understood by persons familiar with loss-in-weight feeding systems. For convenience, the ramp wave-form generated by ramp generator 76 may be referred to as the "set point ramp". The set point ramp wave-form is shown in FIG. 4.

Figure 5:
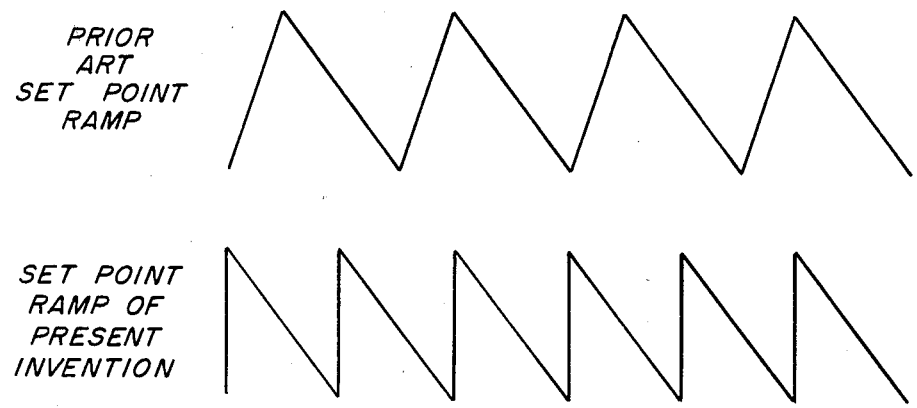
FIG. 5 shows the set point ramp of the present invention in comparison with the prior art.

Although the set point ramp may be generated in a conventional manner, it must be emphasized that the set point ramp of the present invention is not a conventional loss-in-weight set point ramp. The set point ramp of the present invention differs from a conventional set point ramp primarily in that no portion of the set point ramp of the present invention corresponds to the period of time a feeder is being refilled. Each cycle of the present set point ramp represents the loss in weight of one or the other of feeders 16 and 18 during discharge. Other differences between the set point ramp of the present invention and the prior art are shown in FIG. 5.

Instead of utilizing the integrating type of controller described above (i.e., generating a set-point ramp and comparing slope), a differentiating type of controller may be used without departing from the scope of the invention. Differentiating controllers, which generate a fixed setpoint and measure actual mass flow by computing weight loss over a period of time, are well-known in the art and need not be described in detail.

Figure 6:
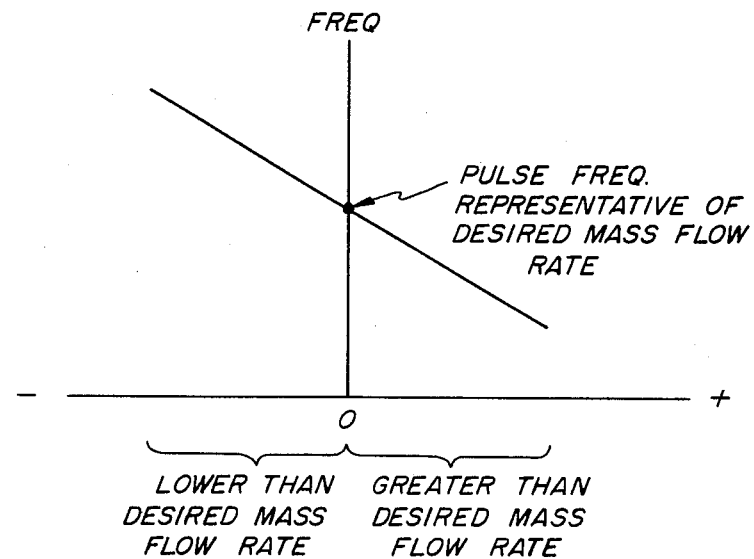
FIG. 6 is a curve of drive command frequency as a function of error signal.

One output of controller 58 is a drive command frequency, which is a series of pulses representative of the speed at which feeder motors 20 and 22 must be driven to obtain an actual mass flow rate equal to the desired mass flow rate selected at control panel 54. The weight output signal from selector 72 is compared to the set point ramp in comparator circuit 78. Comparator circuit 78 is a conventional comparator circuit which compares the instantaneous slope of the weight output signal with the instantaneous slope of the set point ramp and generates an error signal E representative of the difference between the weight output signals and the set point ramp. Error signal E is sent to pulse generator 80, which generates a series of pulses called the drive command signal, shown in FIG. 3 as the Drive CMD Freq. The frequency of the pulses varies with the error signal E so that, for example, when the error signal E indicates an actual mass flow rate greater than desired, the frequency of the pulses decreases, causing feed motors 20 and 22 to run more slowly and thus reduce actual mass flow rate. Conversely, if the error signal E indicates a mass flow rate less than desired, the frequency of the pulses increases, causing motors 20 and 22 to run faster and thus increase actual mass flow rate. Error signal E also controls the speed of feed motor 14 associated with prefeeder 12 so that the speeds of motors 20 and 22 and the speed of motor 14 increase or decrease in the same proportion. The relationship between motors 20 and 22 and motor 14 is discussed more fully below. The relation between the error signal E and the frequency of the pulses is shown in FIG. 6. The way in which the error signal and the drive command signal may be generated will be understood by those versed in the art.

It should also be understood that, although the drive command signal described herein is a series of pulses controlled by the error signal E, the drive command signal could be a voltage, current or any other signal generated in response to error signal E for controlling the motors 14, 20 and 22 without departing from the scope of the invention.

The other output of controller 58 is the A/B SELECT signal. The A/B SELECT signal is a square wave having a period twice that of the set point ramp. Each transition of the A/B SELECT signal causes diverter valve 30 to change position. Likewise, each transition causes selector circuit 72 to switch from one weight signal to the other, as will be explained more fully below. The transitions of the A/B SELECT signal occur at the respective minimum weights of feeders 16 and 18, as shown in FIG. 4. As presently preferred, the weight signal from selector circuit 72 is split in controller 58 and is sent simultaneously to comparator circuit 78 (as described above) and to level detector 82. Level detector 82 is a conventional level detecting circuit. When level detector 82 senses that the weight signal from selector circuit 72 is at a minimum, it signals a logic element 84, shown in FIG. 3 as a flip-flop but which can be any suitable logic element, to change state. The output of logic element 84 is the A/B SELECT signal.

The drive command frequency output of controller 58 is sent to two identical frequency/analog converters 60 and 62, where the drive command frequency is converted to an analog voltage representative of desired feed motor speed. Frequency/analog converters are conventional elements and need not be described further. The outputs of frequency/analog converters 60 and 62 are sent to motor drive circuits 68 and 70 respectively. Motor drive circuits 68 and 70 are conventional circuits. Any conventional motor and motor drive may be used.

The output of motor drive circuit 68 drives feed motors 20 and 22 associated with feeders 16 and 18 respectively. Feed motors 20 and 22 are driven in parallel, so that both motors 20 and 22 are driven at precisely the same speed. The output of motor drive circuit 70 drives feed motor 14 associated with prefeeder 12. Were it not for variable resistors 64 and 66, feed motor 14 would necessarily be driven at the same speed as feed motors 20 and 22, because the same drive command frequency from controller 58 is used to control all three motors. Variable resistors 64 and 66 are provided to "trim" the speeds of the motors so that prefeeder motor 14 may be caused to run more slowly than feed motors 20 and 22. This is to ensure that the maximum volumetric flow of prefeeder 12 will be less than the maximum volumetric flow of feeders 16 and 18, so that there is no possibility of overfeeding feeders 16 and 18 or of accumulating material in the feeders.

All three motors are run continuously when the system is in operation and, because all are driven by the same drive command frequency, the motors "track" each other. That is, the speeds of motors 20 and 22 and the speed of motor 14 increase or decrease in the same proportion. The precise speeds of feed motors 14, 20 and 22 are not critical so long as (1) the speed of motor 14 is less than the speed of motors 20 and 22 so that maximum volumetric flow of prefeeder 12 is preferably less than or equal to 80% of maximum volumetric flow of feeders 16 and 18, and (2) the speed of motor 14 "tracks" the speed of motors 20 and 22 so that the ratio of volumetric flow of prefeeder 12 to volumetric flow of feeders 16 and 18 remains constant, preventing storage in feeders 16 and 18 and minimizing prefeeder-to-collector delay in feed rate adjustments.

In the illustrated embodiment, and as presently preferred, the motor speed control is operated in an "open loop" configuration. That is, no feedback of motor speed information is used to control motor speed. Motor speed is controlled by comparing the loss-in-weight signal representative of material fed from feeders 16 and 18 to the set point ramp signal generated by control panel 54. However, it should be understood that a closed loop motor control with motor speed feedback may be used for even greater accuracy if desired.

The weight output signals of scales 24 and 26 (weight "A" and weight "B" signals, respectively) are sent to selector circuit 72, which is a conventional time multiplexing circuit. The output of selector circuit 72 is described more fully below. The output of selector circuit 72 is sent to controller 58, where, as shown in FIG. 3, it is compared to the set point ramp generated by control panel 54 to generate the drive command frequency signal.

Selector circuit 72 is controlled by the A/B SELECT signal output of controller 58. The A/B SELECT signal causes selector circuit 72 to alternately transmit the discharge portions of the weight output signals of scales 24 and 26 to controller 58 for comparison to the set point ramp in proper timed relationship as discussed more fully below. The A/B SELECT signal is also sent to diverter valve control circuit 74, which actuates diverter solenoid 32 so that the selector circuit 72 and the diverter valve control circuit 74 are operated in synchronism.

Referring to FIG. 4, the weight and control signals are shown in their time relationship. All of the signals shown in FIG. 4 have been idealized for the sake of clarity. In actual practice, the signals shown in FIG. 4 may differ from their idealized form without departing from the instant invention. As described in connection with FIG. 1, diverter valve 30 is operated to cause feeders 16 and 18 to be filled alternately. Thus, for example, when diverter valve 30 is in the first position, material is added to feeder 16 and the weight of feeder 16 will increase as indicated by the top curve in FIG. 4 (weight "A" signal). Meanwhile, the material in feeder 18 is being discharged, and the weight of feeder 18 will decrease, as shown in the third curve in FIG. 4 (weight "B" signal). When controller 52 senses that the weight of feeder 18 has reached a preselected minimum, (point "a" on the weight "B" signal curve), the A/B SELECT signal changes state and causes diverter valve 30 to move to its second position 30', halting the flow of material to feeder 16. Because feed motor 20 is run continuously, the material which was added to feeder 16 will now begin to discharge, and the weight of material in feeder 16 decreases (from point "a" to point "b" on the weight "A" signal curve). The rate at which material is added to feeder 16 (i.e. the discharge rate of prefeeder 12) is chosen to equal the discharge rate of feeder 16. Thus, since input and output rates are equal, there is no storage of material in feeder 16. The feed rate of feeder 16 is chosen such that material begins to be discharged from feeder 16 at precisely the same moment that diverter valve 30 changes position to 30' and feeder 18 begins filling.

At point "b" on the weight "A" signal curve, feeder 16 has discharged all of the material contained therein. When controller 58 senses that the weight of feeder 16 has reached a preselected minimum, the A/B SELECT signal again changes state and causes diverter valve 30 to move from its second position 30' to the first position. Material now begins to refill feeder 16. The weight of material in feeder 16 therefore begins to increase from point "b" to point "c" on the curve, repeating the above-described cycle.

As shown by the second curve in FIG. 4, while feeder 16 is discharging (between points "a" and "b"), the flow of material from feeder 16 is constant. While feeder 16 is being filled (between points "b" and "c"), the flow from feeder 16 is zero. Feeder 18 behaves in the identical manner as feeder 16, except that, because it is filled alternately, the curves representing the change in weight of material in feeder 18 and the discharge of feeder 18 are shifted in time relationship by 180° from the curves for feeder 16.

The fifth curve in FIG. 4 is the set point ramp signal generated by control panel 54. The set point ramp signal is a negative-going ramp with a period T equal to the period of time feeders 16 and 18 require to discharge the material contained therein to obtain the desired mass flow rate selected at control panel 54. The seventh curve in FIG. 3 is the output from selector circuit 72. Selector circuit 72 selects the weight "A" and weight "B" signals from scales 24 and 26 so that only the portion of the weight "A" and weight "B" signals during discharge of the associated feeder are utilized. Each transition of the A/B SELECT signal (the sixth curve in FIG. 4) causes selector circuit 72 to switch from one weight signal to the other. The set point ramp and the weight output from selector circuit 72 are compared in controller 58 to generate the drive command frequency as described above.

The flow of material through feeder 16, for example, may be readily understood by reference to FIG. 4. The flow of material through feeder 18 is identical to that of feeder 16. The speed of feed screw 15 is substantially constant in order to achieve a constant feed rate. Since the speed of feed screw 15 is constant, the transit time of material through feeder 16 is constant. The speed of feed screw 15 is chosen so that material added to inlet 46 of feeder 16 at time $t_0$ reaches outlet 50 at time $t_0+T$. That is, the transit time of material from inlet 46 to outlet 50 is T. It will also be observed from FIG. 4 that diverter valve 30 is moved after each period T of the set point ramp. Thus, since the transit time is T, material added to the feeder during one period is discharged during the next period (when no material is added to feeder 16). Material added to feeder 16 at the beginning of a period T will transit feeder 16 in that period, reaching outlet 50 at the beginning of the next period. Material added at the end of a period T will transit the feeder during the next period and will reach outlet 50 at the end of that next period. Thus, there will be no storage of material in feeders 16 or 18.

When the system is initially started, controller 58 signals selector circuit 72 (by means of the A/B SELECT signal) to send to controller 58 the weight signal from a preselected one of feeders 16 and 18, for example, feeder 18. Thus, the system always begins by "looking at" the weight signal of a preselected scale, in this example, always scale 26. If there is no material in feeder 18 (for example, because diverter valve 30 is in the first position), the weight signal from scale 26 will be at its minimum, corresponding to point "a" on the weight "B" signal curve in FIG. 4. Accordingly, controller 58 is programmed to cause diverter valve 30 to move to the second position 30' to begin filling feeder 18. Diverter valve 30 remains in the second position 30' until controller 58 senses that the weight of feeder 18 is at a preselected maximum. At that point, diverter valve 30 is moved to the first position, feeder 16 begins filling and feeder 18 begins discharging.

When controller 58 senses that the weight of feeder 18 is at the minimum, it signals (by means of the A/B SELECT signal) diverter valve control 74 to energize solenoid 32. Diverter valve 30 is thereby moved to the second position 30' and material being discharged by prefeeder 12 is diverted to feeder 18 to begin filling it. Simultaneously, controller 58 signals selector circuit 72 to transmit to controller 58 the weight signal from scale 24. The material in feeder 16 is now discharged until feeder 16 is empty and the weight of feeder 16 is at a minimum. While feeder 16 is discharging, feeder 18 is being filled. When feeder 16 is empty, feeder 18 will be at its maximum weight. When controller 58 senses that the weight of feeder 16 is at the minimum, it signals diverter valve 74 to de-energize solenoid 32. Diverter valve 30 is returned to the first position and the material being discharged by prefeeder 12 is now diverted to feeder 16, which begins to fill while feeder 18 begins to discharge. This cycle then repeats as long as the system remains in operation. The way in which controller 58 may be programmed to carry out the above-described functions will be readily apparent to persons familiar with loss-in-weight feeding systems and need not be described here in detail.

As presently preferred, controller 58 senses minimum and maximum weights of feeders 16 and 18 by conventional level detecting techniques. However, it is understood that any other method of sensing minimum or maximum such as computing change of slope, for example, may be employed without departing from the instant invention.

By utilizing the weight output of scales 24 and 26 only while their associated feeders 16 and 18, respectively, are discharging, controller 58 is able to make pure loss-in-weight measurements on the discharging feeder. Controller 58 is always performing pure loss-in-weight measurements on one of the two feeders, so that there is no period of time in which the system must be operated in volumetric control.

It should be understood that the invention is not limited to the use of two feeders operating at a fifty percent duty cycle. For example, feeder 16 may have twice the capacity of feeder 18. In this case, the system would operate with feeder 16 on a duty cycle of $\frac{2}{3}$ and feeder 18 on a duty cycle of $\frac{1}{3}$ to provide a constant feed rate. Likewise, the example, four feeders of equal capacity may be used, each operating on a duty cycle of twentyfive percent. Thus, any arrangement of feeder capacity, number of feeders and duty cycles may be employed without departing from the scope of the present invention.

It is also possible to operate the system using only a single scale. For example, scale 26 may be eliminated. In this embodiment, loss-in-weight measurements are made on feeder 16 during the period of time it is discharging. That is, weight signal "A" is compared to the set point ramp by controller 58 while feeder 16 is discharging. The result of the comparison (error signal E) is stored, in conventional fashion, in memory within controller 58. When feeder 16 is empty, diverter valve 30 is moved to the first position as already described, feeder 16 begins to refill and feeder 18 begins to discharge. However, in this embodiment, instead of comparing weight signal "B" to the set point ramp when feeder 18 is discharging, controller 58 recalls from memory error signal E stored when feeder 16 was discharging. The recalled error signal E from feeder 16 is used to control the speed of feed motor 22 in feeder 18. That is, because feeders 16 and 18 are identical, it is assumed that the weight signal "A" during discharge of feeder 16 is identical to the weight signal "B" when feeder 18 is discharging. Thus, both feeders 16 and 18 are controlled by the weight signal of one of them. The error signal E is updated for each discharge cycle of feeder 16.

This embodiment is of course inherently less accurate than the first-described embodiment because during the time feeder 18 is discharging no actual loss-in-weight measurements are being made. Thus, during the time feeder 18 is discharging, the system actually is operating in what may be called "quasi-gravimetric" control, which is an approximation of gravimetric control, rather than true gravimetric control. However, this embodiment is also less complex than the first embodiment, and for certain applications may provide suitable accuracy.

The present invention may be embodied in other specific forms without departing from the spirit or essential attributes thereof and, accordingly, reference should be made to the appended claims, rather than to the foregoing specification, as indicating the scope of the invention.

What is claimed is:

1. A loss-in-weight feeding system comprising:
   a plurality of means for receiving material and discharging said material at a controlled rate;
   means for providing a representation of a predetermined discharge rate;
   means for selectively and successively providing a representation of the weight of material in each of said plurality of means;
   means for successively comparing said representation of a predetermined discharge rate with a representation of the weight of material in each of said plurality of means for controlling each of said plurality of means to successively discharge materials from each of said plurality of means at a discharge rate equal to said predetermined discharge rate;
   means for successively feeding material at a controlled rate to each of said plurality of means when it is not discharging; and
   wherein said means for feeding is responsive to said representation of a predetermined discharge rate and feeds said material at a controlled rate substantially equal to said predetermined discharge rate.

2. A loss-in-weight feeding system comprising:
   first means for receiving material and discharging said material at a controlled rate;
   second means for receiving material and discharging said material at a controlled rate;
   means for providing a representation of a predetermined discharge rate;
   means responsive to said respresentation and to the weight of material in said first and second means for controlling said first and second means to continuously discharge material alternately from said first and second means at a continuous discharge rate substantially equal to a predetermined discharge rate;
   third means, responsive to said controlling means, for feeding the material alternately to each of said first and second means at a controlled feed rate when it is not discharging; and
   wherein each of said first, second, and third means are coupled to said controlling means such that said controlled feed rate and each of said discharge rates of said first and second means are maintained substantially equal to said predetermined discharge rate.

3. The system of claim 2 wherein said means for controlling includes means for providing an indication of the weight of the discharging one of said first and second means, means for comparing said weight indication with said representation, and means responsive to said comparison for maintaining the discharge rate of the discharging one of said first and second means at said predetermined discharge rate.

4. The system of claim 2 wherein said means for controlling includes means for providing a representation of the weight of said first means during discharge of said material, means for providing a representation of the weight of said second means during discharge of said material, and means for comparing said representation of said predetermined discharge rate with said representation of weight from the discharging one of said first and second means to maintain said discharge rate of the discharging one of said first and second means at said predetermined discharge rate.

5. The system of claim 4 wherein said controlling means further includes means for causing said third means to feed material to one of said first and second means while the other of said first and second means is discharging material.

6. The system of claim 5 wherein said means for causing is responsive to a predetermined minimum weight of the discharging one of said first and second means for feeding material to said one of said first and second means.

7. The system of claim 5 wherein said means for causing is constructed to cause said third means to feed material alternately to the first and second means for substantially equal periods of time.

8. A loss-in-weight material feeding system comprising:
   first means for receiving material and discharging material;
   at least second and third means for receiving material from said first means and discharging said received material;
   means for alternately feeding material discharged from said first means to said at least second and third means;

means for generating first and second signals representative of the weight of material in a respective one of said second and third means;

means for generating a reference signal representative of a desired material flow rate;

means for alternately comparing said reference signal with said first and second signals;

means for controlling said second and third means in response to said comparison with said first and second signals, respectively, to alternately control the discharge of material from said second and third means, respectively;

wherein said means for controlling is coupled to said first means such that said first means first discharges material into one of said second and third means while the other of said second and third means is controlled in response to said comparison between the reference signal and the associated signal representative of the weight of that means; and wherein said means for controlling controls the rate of discharging of said first means and the rate of discharging of said second and third means so that the rate of discharging of said first means is substantially equal to the rate of discharging of said second and third means.

9. The system of claim 8 wherein said means for controlling controls said second and third means for discharging its material at substantially said desired material flow rate, and said means for feeding feeds material alternately to said second and third means for substantially equal periods of time.

10. The system of claim 8 wherein said means for controlling controls said means for feeding such that said material from said first means is supplied to one of said second and third means different from the one of said second and third means being controlled by said comparison.

11. The system of claim 8 wherein said means for generating a reference signal generates a sawtooth wave-form having a slope representative of the desired material flow rate.

12. The system of claim 8 wherein said means for generating a reference signal comprises means for generating a set point ramp.

13. The system of claim 8 wherein said means for generating generates a reference signal representing a desired change in material weight with respect to time.

14. A loss-in-weight-feeding system comprising:
first means for receiving material and discharging material;
at least second and third means for receiving material from said first means and discharging said received material;
means for alternately feeding material discharged from said first means to said at least second and third means;
means for generating first and second signals representative of the weight of material in a respective one of said second and third means;
means for generating a reference signal representative of a desired material flow rate;
means for alternately comparing said reference signal with said first and second signals;
means for controlling said second and third means in response to said comparison with said first and second signals, respectively, to alternately control the discharge of material from said second and third means, respectively;
wherein said means for controlling is coupled to said first means such that said first means first discharges material into one of second and third means while the other of said second and third means is controlled in response to said comparison between the reference signal and the associated signal representative of the weight of that means;
wherein said first, second and third means each includes a motor driven feeder for discharging material and wherein said control means is coupled to drive the motors of said first, second and third means with a common control signal.

15. The system of claim 14 further including means for maintaining the ratio of volumetric flow of the first means to volumetric flow of the second and third means substantially constant.

16. The system of claim 15 wherein said means for maintaining maintains said ratio at a value less than one.

17. A continuous loss-in-weight material feeding system comprising:
a prefeeder for receiving and discharging material;
at least first and second feeders for receiving material from said prefeeder and discharging the received material to a common collector;
means for diverting discharged material from said prefeeder to said first feeder in a first position of the divertig means to said second feeder in a second position of the diverting means different from the first position;
means for generating first and second signals representative of the weight of material in said first and second feeders respectively;
means for generating a reference signal representative of a desired material flow rate;
means for alternately comparing said reference signal to one of said first and second weight signal synchronous with the discharge of material from the prefeeder to the other of said first and second feeders;
means for controlling the discharge of material from each of said first and second feeders based on the comparison of said reference signal with the first and second weight signals, respectively, to maintain the feeder discharge rate of that feeder at said desired material flow rate; and
wherein said controlling means controls the discharge rate of said prefeeder and the discharge rate of each of said first and second feeders so that the discharge rate of said prefeeder is substantially equal to the discharge rate of each of said first and second feeders and to said desired material flow rate.

18. The system of claim 17 wherein said means for diverting is responsive to said means for controlling to maintain said means for diverting in said first and second positions for substantially equal periods of time.

19. A continuous loss-in-weight material feeding system comprising:
a prefeeder for receiving and discharging material;
at least first and second feeders for receiving material from said prefeeder and discharging the recieved material to a common collector;
means for diverting discharged material from said prefeeder to said first feeder in a first position of the diverting means and to said second feeder in a second position of the diverting means different from the first position;

means for generating first and second signals representative of the weight of material in said first and second feeders, respectively;

means for generating a reference signal representative of a desired material flow rate;

means for alternately comparing said reference signal to one of said first and second weight signal synchronous with the discharge of material from the prefeeder to the other of said first and second feeders;

means for controlling the discharge of material from each of said first and second feeders based on the comparison of said reference signal with the first and second weight signals, respectively, to maintain the material discharge rate of that feeder at said desired material flow rate; and wherein said prefeeder and said first and second feeders are coupled to said controlling means such that the discharge rate of each is controlled by a common signal.

20. The system of claim 19 wherein said means for generating a reference signal generates a ramp signal indicative of material flow rate.

21. The system of claim 19 wherein said means for generating a reference signal comprises generating a signal representing a desired change in rate with respect to time.

22. The system of claim 21 wherein said means for generating said first and second signals comprises means for generating first and second signals representative of the change in weight of said first and second feeders with respect to time.

23. A technique for loss-in-weight material feeding comprising:

discharging material from a first source;

alternately feeding material discharged from said first source to at least second and third sources;

alternately discharging material from said second and third sources to a common source;

detecting the weight of material in each of said second and third sources;

generating signals indicative of the weight of material in said second and third sources respectively;

generating a reference signal representative of a desired material discharge rate;

alternately comparing said reference signal with each of said signals indicative of the weight of said second and third sources;

controlling the discharge of material from the discharging one of said second and third sources in response to said comparison to cause the rate of discharge from that source to be equal to the desired material discharge rate during the time that material from said first source is being fed to the other of said first and second sources; and wherein said step of discharging material from said first source comprises discharging material at a rate substantially equal to the rate at which material is discharged from said second and third sources.

24. The technique of claim 23 wherein said feeding step includes diverting material to each of said first and second sources for substantially equal periods of time.

* * * * *